United States Patent [19]
Pyykonen

[11] 3,989,135
[45] Nov. 2, 1976

[54] APPARATUS FOR SINGLE FEEDING TIMBER

[75] Inventor: Niilo Pyykonen, Lappeenranta, Finland

[73] Assignee: Plan-Sell Oy, Helsinki, Finland

[22] Filed: June 21, 1974

[21] Appl. No.: 481,849

[30] Foreign Application Priority Data
Aug. 9, 1973 Finland .............................. 2508/73

[52] U.S. Cl. ............................................. 198/461
[51] Int. Cl.[2] ......................................... B65G 47/26
[58] Field of Search ............... 198/34, 26, 102, 162, 198/165, DIG. 10, 156, 163, 84

[56] References Cited
UNITED STATES PATENTS

| | | | |
|---|---|---|---|
| 2,679,919 | 6/1954 | De Koning .................... | 198/102 X |
| 3,080,042 | 3/1963 | Sherman ......................... | 198/34 |
| 3,081,863 | 3/1963 | Monohan ........................ | 198/102 X |
| 3,162,292 | 12/1964 | Lawson ........................... | 198/34 X |
| 3,209,890 | 10/1965 | Miles .............................. | 198/34 |
| 3,363,740 | 1/1968 | Hanbury ......................... | 198/34 |
| 3,608,695 | 9/1971 | Hellstrom ....................... | 198/34 |
| 3,661,243 | 5/1972 | Piatek ............................. | 198/34 |

FOREIGN PATENTS OR APPLICATIONS

| | | | |
|---|---|---|---|
| 2,003,252 | 7/1971 | Germany ........................ | 198/34 |

*Primary Examiner*—Robert J. Spar
*Assistant Examiner*—James M. Slattery
*Attorney, Agent, or Firm*—Cushman, Darby & Cushman

[57] ABSTRACT

An apparatus for single feeding of timber from a single layer mat of the timber is disclosed, the apparatus having a rigid frame on a base, a first conveyor for transferring the single layer mat of timber against a stop, a second conveyor, and a third conveyor between the first and the second conveyor for transferring one timber at a time at even intervals from the first conveyor onto the second conveyor, the third conveyor being provided with members for lifting a piece of timber retained by the stop to transfer it past the stop.

3 Claims, 4 Drawing Figures

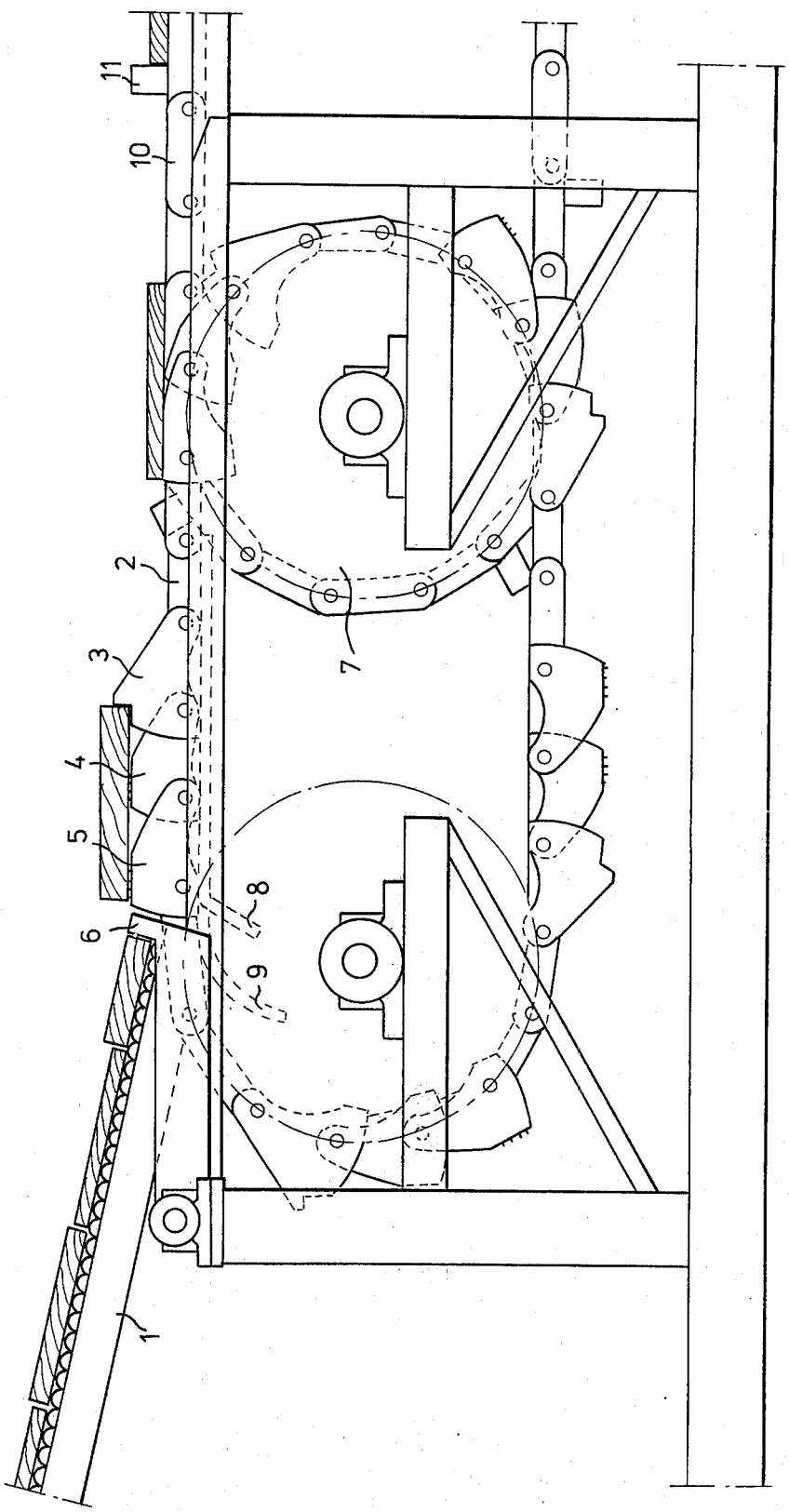

APPARATUS FOR SINGLE FEEDING TIMBER

BACKGROUND OF THE INVENTION

1. Field of the Invention

The invention relates to the field of timber feeding apparatuses and especially to apparatuses for single feeding of timber from a single layer mat of the timber.

2. Description of the Prior Art

Nowadays the saw mill industry uses different individual batching devices which receive their actuating orders on the basis of either the thickness, width, or length, of the timber, or a combination of these. Also known are timber batching devices of the type mentioned in the first paragraph, in which pieces of timber are batched from a first conveyor by means of a second or an intermediate conveyor onto a third conveyor which has been provided with thrusting members or grippers so that one piece of timber comes into each interval between the thrusting members regardless of the length and the thickness of the timber. The problem has been the elimination of the effects of width variations on the batching.

The currently used timber batching devices can be divided into two main categories. In the first category, pieces of timber which succeed one another in a mat of timber are lifted one by one from the first conveyor level over a stop device so that the piece is thrust onto an intermediate conveyor which moves at a greater velocity to create a gap between the pieces of timber and to transfer them into the intervals between the thrusting members of a third conveyor, one into each interval. In the second category, the stop device lowers for a certain period and releases one piece of timber at a time either along an intermediate conveyor or directly into the thrusting member intervals of a conveyor with thrusting members.

Satisfactory batching results at a rate of 50–60 pieces of timber a minute have been achieved in both categories. Other technology has, however, developed so rapidly that at the moment the batchers should be capable of batching more than 100 pieces of timber a minute in continuous operation. The above devices are not capable of this, and so many errors have occurred in the batching that the entire production rhythm has been confused.

The object of the present invention is to eliminate the above disadvantages and to provide a device, faster and more dependable than previously, for the individual batching of timber.

SUMMARY OF THE INVENTION

The feeding apparatus according to the invention deviates from previously known ones mainly in the respect that members to lift a piece of timber retained by a stationary stop or one than can be lowered and to transfer it over the stop have been fitted on the second conveyor of a batching device according to the invention so that they move along with the second conveyor.

The known devices have a member, e.g. a conveyor that can be raised and lowered for lifting a piece of timber retained by a stationary stop so that the piece is thrust over the stop. Transferring the frontmost piece of timber past the stop by means of the first conveyor is, however, a relatively slow method compared with the method that the first piece of timber is gripped and lifted over and past the stop, as is done in the device according to the invention. The same applies to the known device in which the stop is lowered for a moment so that the frontmost piece of timber can move past the stop. Even in this case the speed at which the frontmost piece starts determines the operation rate of the entire batching device. On the other hand, in a device according to the present invention, lifting and gripping members attached to the intermediate conveyor both lift and transfer the pieces of timber one by one at the velocity of the intermediate conveyor at approximately even intervals, calculated from the front edge of the pieces of timber, onto a third conveyor, regardless of the width of the pieces of timber.

BRIEF DESCRIPTION OF THE DRAWINGS

FIG. 1 shows a side view of a preferred embodiment of the invention.

DESCRIPTION OF THE PREFERRED EMBODIMENT

Figure 2A:
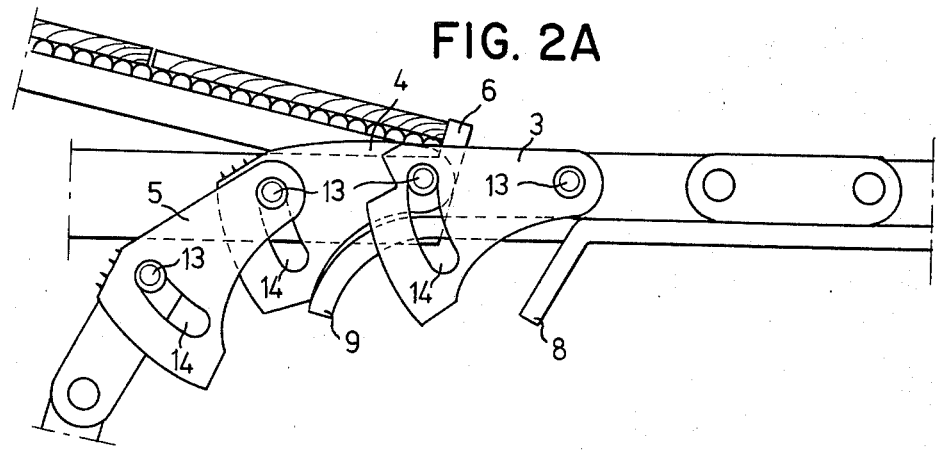
FIG. 2 shows various operation stages of the device according to the invention, on a larger scale.

In FIG. 1 the first conveyor is indicated by 1. It is in this case a slanted roller track on which the pieces of timber move transversally as a single-layered timber mat. The length, thickness, and width of the pieces of timber on the first conveyor may vary. At the end of the first conveyor 1, or the batching point, there is a stop 6 which keeps the pieces of timber on the slanted roller track 1 in place.

Underneath the lower end of the slanted roller track 1 there are several chain conveyors next to each other in the transversal direction; they constitute the intermediate or second conveyor 2, which extends forward from below the lower end of the slanted roller track 1 and has been connected by means of a chain wheel 7 to a chain or third conveyor 10 provided with thrusting members 11. An interval between two thrusting members of the third conveyor 10 is so great that even the widest piece of timber fits in it.

A group of successive lever arms 3, 4, and 5 have been fitted to each chain conveyor 2 at a certain interval from each other in the longitudinal direction of the chain 2; the front ends of the lever arms have been attached with bearings, so that they can turn to horizontal, transversal pins 13 fitted to the chain 2 and their back ends have been fitted to move between two extreme positions by means of a curved, oblong gap 14 at their back ends and into which the turning pin 13 of the next lever arm 4 or 5 is thrust.

In the rising part of the chain 2, the lever arms 3, 4, and 5 are in their lower position, but in the upper part of the chain 2 the lever arms, supported by rails 8 and 9 are fitted under the chain 2, are in their upper position, where they extend above the chain 2 and support the piece of timber.

Figure 2B:
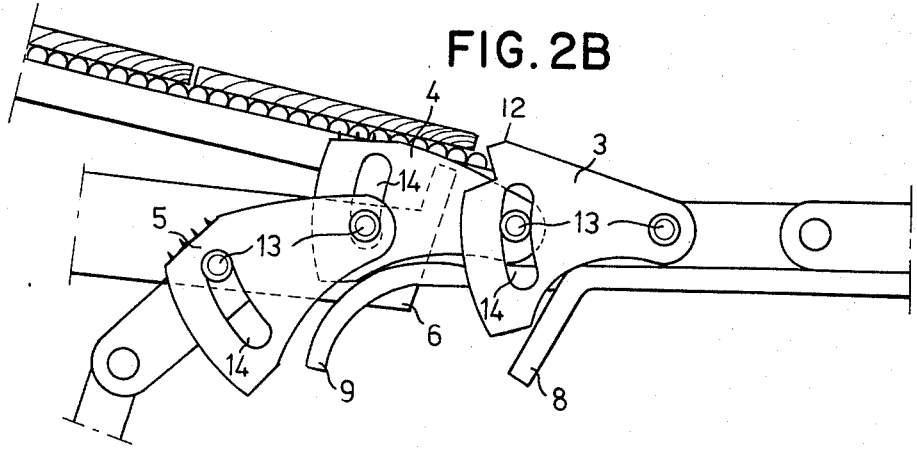
Figure 2C:
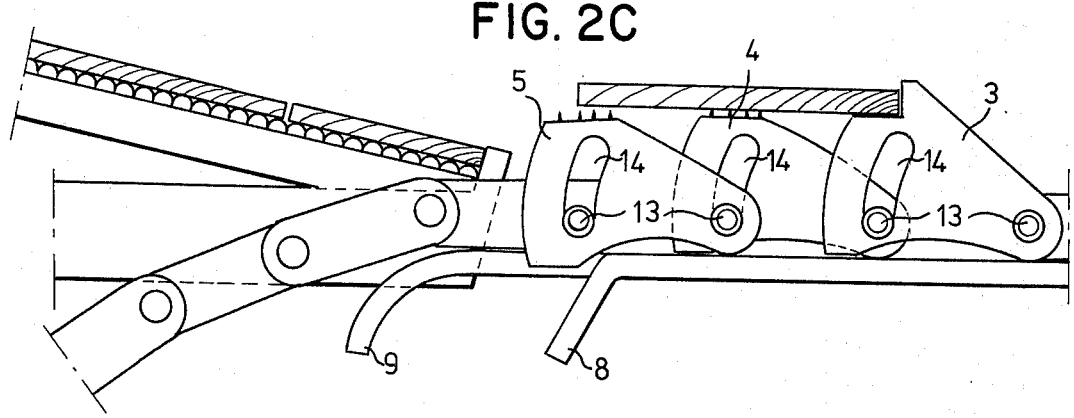

As seen from FIG. 2, the rail 8 has been fitted so that it only affects the frontmost and the hindmost lever arms 3 and 5, while the second rail 9 has been fitted to affect the second lever arm 4 prior to the batching point. The purpose of this arrangement is indicated in the description below, with reference to FIG. 2.

At the stage shown in FIG. 2, all lever arms 3, 4, and 5 of the lever arm group A are, under the influence of gravity, still at their lower position, resting on pins 13. Even the frontmost lever arm 3 is in its lower position below the level of the chain 2, and thus it does not affect the piece of timber retained by the stop 6 even though it is immediately below the stop. Only at stage B does the frontmost lever arm 3 rise above the level of the chain 2, but then it has already passed the batching point. The rail 9, instead, lifts the second lever arm 4 above the level of the chain 2 and the conveyor 1 even before the batching point, whereby the lever arm lifts and transfers the piece of timber retained by the stop 6 over the stop 6. At stage C the rail 8 has raised even the third lever arm 5 above the level of the chain 2, and it can be seen that all the three lever arms support the piece of timber caught by the lever arm 4 and move it forward towards the third conveyor 10.

The front part of the supporting surface of the frontmost lever arm 3 also has a beak 12 the purpose of which is to prevent the piece of timber from gliding over the lever arm. The hindmost lever arm 5 is necessary for very wide piece of timber which would otherwise not stay on lever arms 3 and 4. Furthermore, the supporting surfaces of the lever arms 4 and 5 have preferably been scored. so that the piece of timber moves along better.

As said above, the stop 6 can be either stationary or such that it can be lowered. It must also be considered evident that the frontmost and the hindmost lever arms 3 and 5 and the rail 8 are not necessary for the operation of a device according to the invention. It is equally clear that the second lever arm 4 can be fixed in its upper position, whereby even the rail 9 is unnecessary, and that the first conveyor 1 can also be a conventional chain conveyor. The third conveyor can be provided with thrusting members or be without them.

What I claim is:

1. Apparatus for feeding single pieces of timber from a single layer mat of the timber comprising a rigid frame; a first conveyor mounted in the frame for transferring the single layer mat of timber against a stop at the end of the first conveyor; a third conveyor attached to the frame at some distance forward of the stop in the direction of transport; a second conveyor including an endless moving track, said second conveyor being mounted in the frame between the first and the third conveyors for transferring one timber at a time at even intervals, calculated from the front edge of the timber, from the first conveyor to the third conveyor, said second conveyor including timber supporting members fitted to said track so as to move therewith in an endless path, said members adapted to lift a piece of timber retained by the stop and transfer the timber past the stop to said third conveyor; and means fixedly attached to the frame for cooperation with and actuating the timber supporting members to raise the supporting members to supporting positions as they move past the stop.

2. Apparatus as in claim 1 further comprising a member carried by the endless track at a location in advance of the timber supporting members means for holding the piece of timber on the timber supporting members.

3. Apparatus as in claim 1 wherein said moving track includes a flexible endless member looped around two wheels rotatably mounted on said frame, one of said wheels being mounted under said stop and the other of said wheels being mounted under the receiving end of said third conveyor.

* * * * *